(12) United States Patent
Hong Meng

(10) Patent No.: US 10,945,564 B2
(45) Date of Patent: Mar. 16, 2021

(54) BATHING APPARATUS WITH RECYCLING SYSTEM

(71) Applicant: Johnson & Nicholson (M) Sdn Bhd, Kuala Lumpur (MY)

(72) Inventor: Alan Chew Hong Meng, Kuala Lumpur (MY)

(73) Assignee: Johnson & Nicholson (M) Sdn Bhd, Kuala Lumpur (MY)

( * ) Notice: Subject to any disclaimer, the term of this patent is extended or adjusted under 35 U.S.C. 154(b) by 0 days.

(21) Appl. No.: 15/532,504

(22) PCT Filed: Dec. 2, 2015

(86) PCT No.: PCT/MY2015/000102
§ 371 (c)(1),
(2) Date: Jun. 2, 2017

(87) PCT Pub. No.: WO2016/089197
PCT Pub. Date: Jun. 9, 2016

(65) Prior Publication Data
US 2018/0014697 A1    Jan. 18, 2018

(30) Foreign Application Priority Data
Dec. 2, 2014  (MY) .................... MYPI 2014703602

(51) Int. Cl.
| A47K 3/022 | (2006.01) |
| A47K 3/00 | (2006.01) |
| E03B 1/04 | (2006.01) |
| A47K 3/06 | (2006.01) |
| A47K 3/28 | (2006.01) |
| C02F 1/44 | (2006.01) |

(52) U.S. Cl.
CPC .............. *A47K 3/022* (2013.01); *A47K 3/006* (2013.01); *A47K 3/06* (2013.01); *A47K 3/282* (2013.01); *C02F 1/44* (2013.01); *E03B 1/042* (2013.01); *E03B 2001/045* (2013.01)

(58) Field of Classification Search
CPC ........ A47K 3/022; A47K 3/006; A47K 3/282; C02F 1/44; E03B 1/042; E03B 2001/045
USPC ................................... 4/540, 604, 555, 601
See application file for complete search history.

(56) References Cited

U.S. PATENT DOCUMENTS

| 4,055,863 | A | * | 11/1977 | Duval | A61G 7/0005 4/601 |
| 4,340,981 | A | * | 7/1982 | Vanags | A61H 33/06 4/536 |
| 4,796,312 | A | * | 1/1989 | Corlew | A47K 3/006 4/555 |
| 4,890,341 | A | * | 1/1990 | Forbes | A47K 3/006 4/555 |
| 5,868,937 | A | * | 2/1999 | Back | E03B 1/042 210/651 |

(Continued)

Primary Examiner — Tuan N Nguyen
(74) Attorney, Agent, or Firm — Michael D. Eisenberg (57) ABSTRACT

A bathing apparatus (100) includes a lower body (102) comprising engine components, an upper body (108) mounted on the lower body (102). The lower body (102) includes a watertight enclosure adapted to accommodate a person therein. The engine components in said lower body (102) are configured to manage the water in enclosure of said upper body (108) by receiving water therein from outside and pumping the water into said upper body (108).

7 Claims, 8 Drawing Sheets

(56) References Cited

U.S. PATENT DOCUMENTS

2006/0080772 A1* 4/2006 Saiz ..................... A47K 3/006
4/596

* cited by examiner

BATHING APPARATUS WITH RECYCLING SYSTEM

FIELD OF INVENTION

The present invention relates to a bathing support apparatus for persons who are physically incapable of bathing themselves, particularly the disabled and elderly with limited mobility.

BACKGROUND OF THE INVENTION

Various bathing facilities have been specially developed to address difficulties that are generally suffered by people with limited mobility such as the disabled and elderly, particularly those who are confined to wheelchairs, during their bath and/or shower. Such facilities include walk-in bathtubs, wheel-in showers and walk-in showers, which generally have a doorway-type of opening formed in one sidewall of the bathtub to provide accessibility of a wheelchair into the bathtub.

Despite the fact that the above-described bathing facilities are able to provide a simpler access for the elderly and disabled persons to enter the bathtub, they however are not widely-employed for home use. This is mainly due to the relatively expensive costs for installation, and also largely due to the requirement of a substantially large space before they can install the doors, lifts, and tracks of the bathtubs. Furthermore, these are not usable by everyone in the household except the disabled users. As such, they may not be suitable for use as typical bathrooms of most private homes.

Accordingly, it is the primary object of the present invention to alleviate limitations associated with these existing bathing facilities for the disabled users by providing a collapsible moveable bathtub that is transferable from one location to another, without the need to be permanently installed or positioned in a standard bathroom, which generally are stymied by limited space.

It is yet another object of the present invention to provide a bodysuit having straps that is slidably connected to a transverse supporting bar provided in a bathroom by means of an extendable and retractable cable, and which configured to lift and to hold the body of the disabled users so that they can step in or out of the moveable bathtub themselves with minimal risk of falling.

It is yet another object of the present invention to provide a platform configured to provide the disabled users a zero-step walkway connecting to the moveable bathtub. Other objects of this invention will become apparent on the reading of this entire disclosure.

SUMMARY OF THE INVENTION

In one aspect of the present invention, provided a bathing apparatus specifically configured for elderly and disabled persons so that he/she could safely access the bathroom. The bathing apparatus having a lower body includes an engine components, an upper body mounted on the lower body includes a watertight enclosure adapted to accommodate a person therein, wherein the engine components in the lower body configured to manage the water in enclosure of the upper body by receiving water therein from outside and pumping the water into the upper body.

The bathing apparatus having the engine components include at least one electric pump.

The bathing apparatus having the upper body is a watertight enclosure having four sides with front panel open providing a person to step into or out.

The upper body includes space for allowing a person to sit, stand or accommodating a wheel chair of a disabled.

The front panel of the bathing apparatus is configured with a drawbridge to step into the upper body arranged with rough surface.

The front panel of the bathing apparatus is configured with a swing door.

The front panel of the bathing apparatus is arranged with a rubber sealer to filling the gap avoiding the water leaking out.

The bathing apparatus having an upper body is fixed on the lower body by means of metal stand of the lower body driven into the holes of the upper body.

The bathing apparatus having an upper body comprises an extendable or retractable cable to release or draw the wheel chair into the bathing apparatus.

The bathing apparatus having the engine components in the lower body pump the water into upper body by means of a shower bath arrangement or by a simple pump.

In another aspect of the present invention, provided a bathing apparatus specifically configured for recycling the used water to continuously access the bathroom without any deficiency of water. The bathing apparatus with a recycling of water includes a lower body comprising an engine components, a used water tank holding used water and a clean water tank holding clean water; an upper body mounted on the lower body includes a watertight enclosure accommodating a person therein, receiving the clean water from the clean water tank and releasing used water into the used water tank, wherein the engine components in the lower body includes at least one electric pump configured to receive the used water from used water tank and pumping into clean water tank via at least one membrane filter.

The bathing apparatus having the engine components in the lower body pump the water into upper body by means of a shower bath arrangement or by a simple pump.

The bathing apparatus further includes an additional water tank to hold the clean water for future use.

In another aspect of the present invention, a bathing apparatus made from plurality of partitions, includes a click and lock system on ends of said partitions, arranging the partitions in rectangular shape with front end open for user entry, said front end is closed by means of front panel.

BRIEF DESCRIPTION OF THE DRAWINGS

Other objects, features, and advantages of the invention will be apparent from the following description when read with reference to the accompanying drawings. In the drawings, wherein like reference numerals denote corresponding parts throughout the several views:

FIG. 3a, 3b, 3c, 3d, 3e, ef, 3g illustrates the prior art design of front panels, whereas FIGS. 3b-3d illustrate the front panel of the bathing apparatus with accordance to a preferred embodiment of the present invention.

DETAILED DESCRIPTION OF THE PREFERRED EMBODIMENTS

Figure 1A:
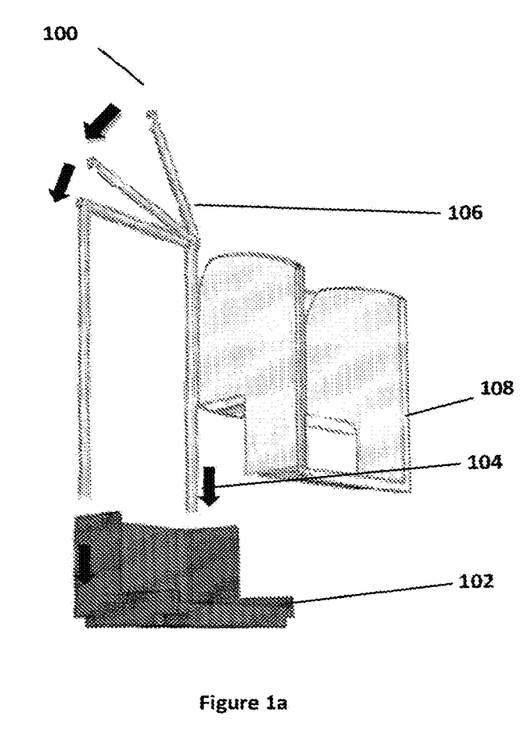
FIGS. 1a-b illustrates a bathing apparatus with accordance to a preferred embodiment of the present invention.
Figure 1B:
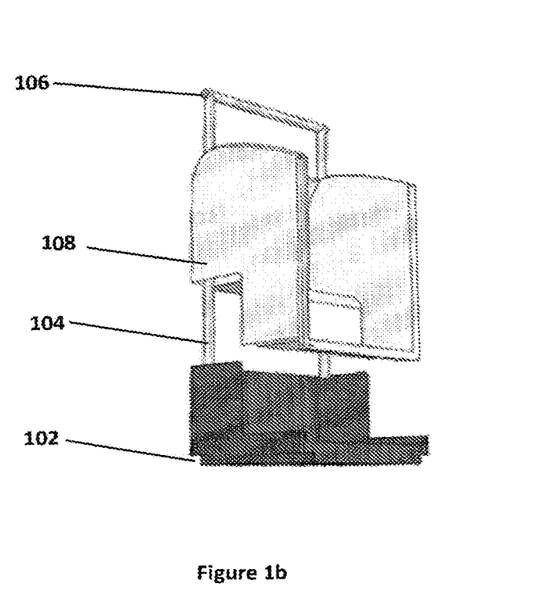

Referring to FIGS. 1a-b, there is illustrated a bathing apparatus (100) specifically configured for elderly and disabled persons so that he/she could safely access the bathroom, with accordance to one preferred embodiment of the present invention. The bathing apparatus (100) includes a lower body (102), an upper body (108) fixed or placed on lower body (102), a thread-less bolts (104) extending from the lower body (102) configured to assist the placement of upper body. The upper body (108) includes plurality of holes to pass through the thread-less bolts (104) allowing to fit the upper body (108) on to lower body (102). The thread-less bolts (104) are joined by a horizontal bar (106) allowing the user to hold and move the bathing apparatus (100).

Figure 2A:
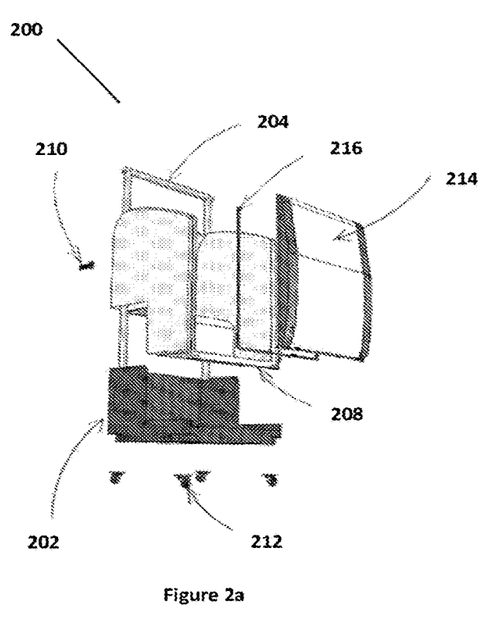
FIG. 2a-2b illustrates an exploded view of the bathing apparatus with accordance to the preferred embodiment of the present invention.
Figure 2B:
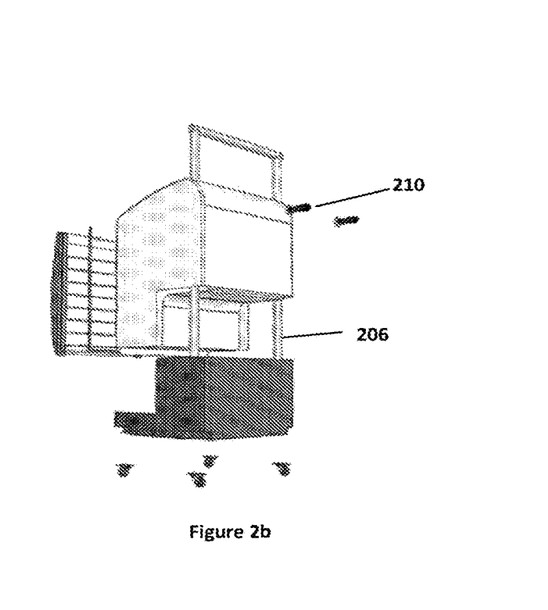

FIGS. 2a-2b illustrate an exploded view of the bathing apparatus with accordance to the preferred embodiment of the present invention. The bathing apparatus includes lower body (202), upper body (208) placed on lower body (202), a thread-less bolt (206) aligning the upper body (208) on lower body (202). A plurality of wheels (212) fitted on the bottom panel of the bathing apparatus (200) is also provided to allow the user to move the bathing apparatus (200) from one location to another location.

According to the preferred embodiment of the present invention, the upper body (208) is a water tight enclosure having four sides with front panel (214) configured for a person to step-in or step-out.

According to the preferred embodiment of the present invention, the upper body (208) includes a seating arrangement for a person while utilizing bathing apparatus (200).

According to the preferred embodiment of the present invention, the bathing apparatus having a rubber sealer (216) filling the gap for the front panel (214) open or close.

Figure 3A:
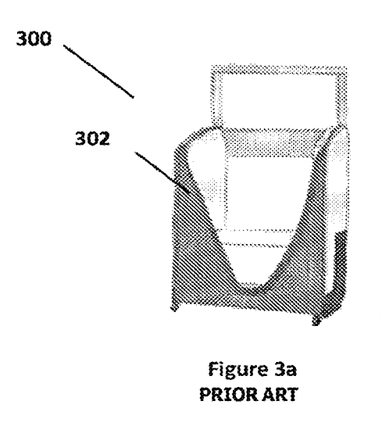
Figure 3B:
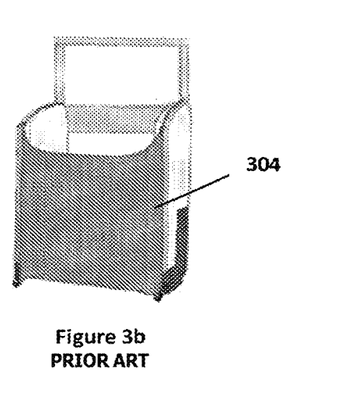

FIG. 3a-3g illustrate the front panel designs of the bathing apparatus with accordance to a preferred embodiment of the present invention. FIGS. 3a-3b illustrates the prior art design of the front panels (302, 304).

Figure 3C:
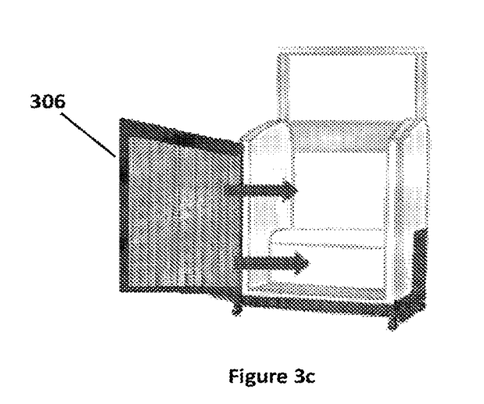

FIG. 3c illustrates an improved front panel (306) design for the bathing apparatus.

The design of the front panel (306) is selected as a swing door in the upper body to close and open the front panel for accessing the bathing apparatus.

Figure 3D:
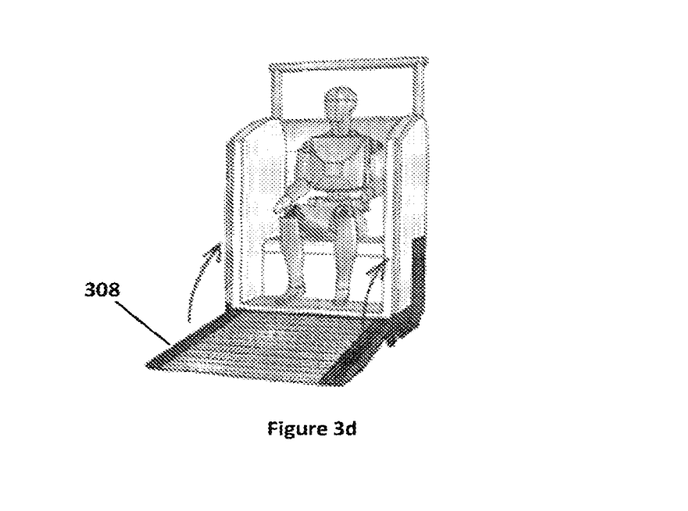

FIG. 3d illustrates another improved front panel (308) design for the bathing apparatus. The design of the front panel (308) is selected as a draw bridge in the upper body to close and open the front panel for accessing the bathing apparatus. The draw bridge door is advantageous to users who have difficulties walking or cannot lift their feet over even 1 inch obstacles can walk up through the draw bridge door further installed with some safety guard rails to lead user into the bathing apparatus.

Figure 3E:
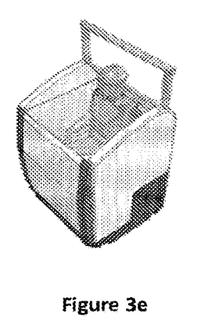
Figure 3F:
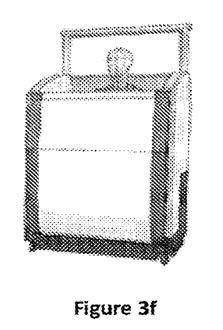
Figure 3G:
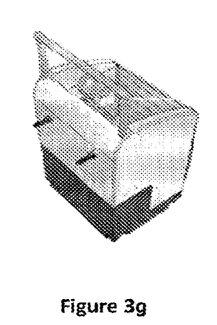
Figure 4A:
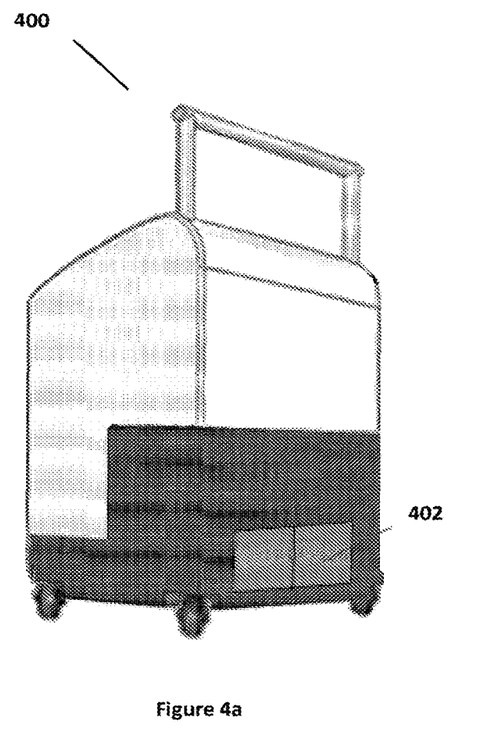
FIG. 4a-4b illustrates an overview of recycling system of the bathing apparatus with accordance to a preferred embodiment of the present invention.
Figure 4B:
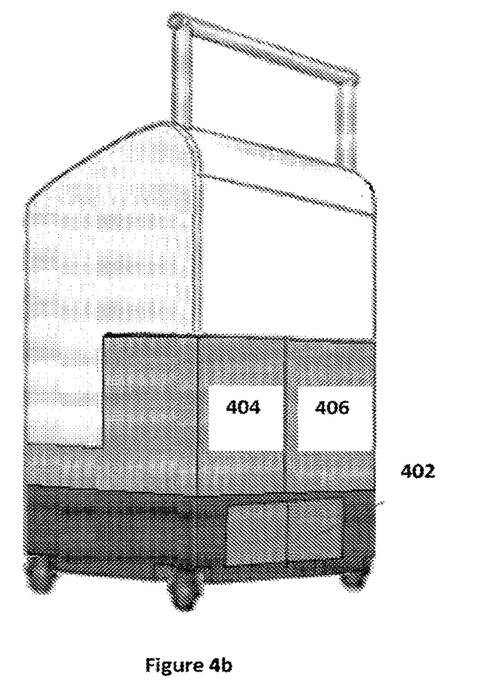

FIGS. 3e-g illustrate various views of the bathing apparatus in the closed front panels. FIGS. 4a-b illustrate an overview of recycling system of the bathing apparatus with accordance to a preferred embodiment of the present invention. The recycling system (400) is arranged in the lower body. The recycling system (400) receives the used water (404) from the upper body and releases the clean water (406) hence recycling the used water. The recycling system (400) having an electric pump (402) managing the water in the upper body, by pumping the clean water into upper body.

Figure 5:
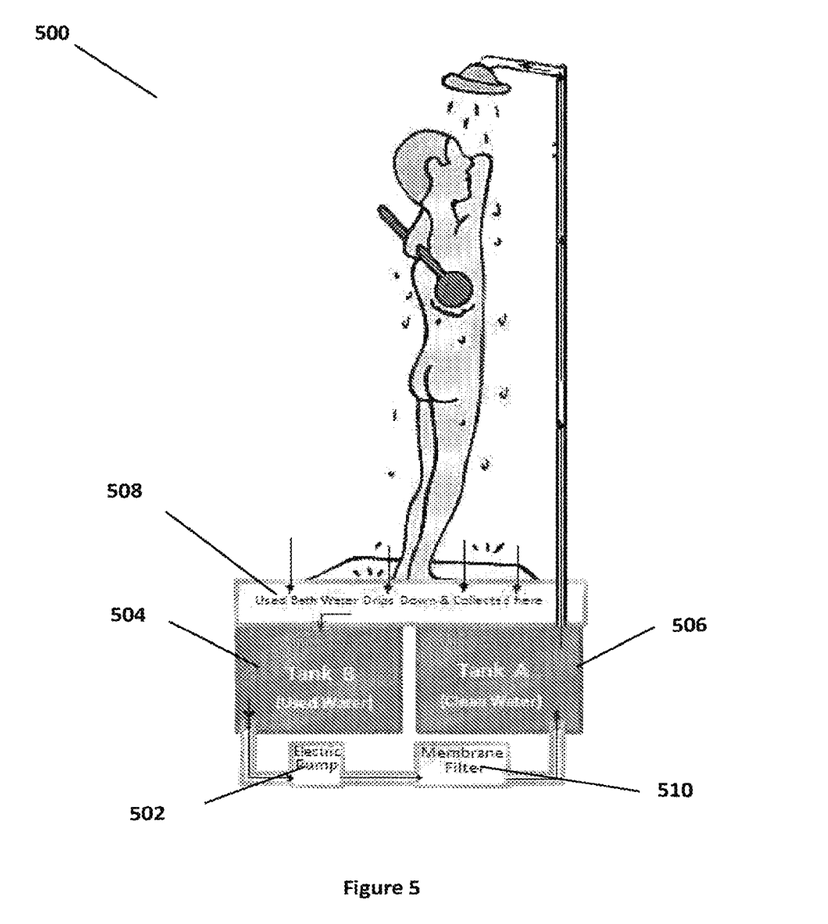
FIG. 5 illustrates an internal view of recycling system of the bathing apparatus with accordance to a preferred embodiment of the present invention.

FIG. 5 illustrates an internal view of recycling system of the bathing apparatus with accordance to a preferred embodiment of the present invention. The recycling system (500) having a used water tank (504) collecting the used water from upper water tank (508), clean water tank (506) collecting the clean water passed through an electric pump (502) and membrane filter (510). As shown in FIG. 5, consists of an additional component such as shower bath connected to the clean water tank (506).

According to the preferred embodiment of the present invention as shown in FIG. 5, a separate electric pump to pump the water into shower head for bathing.

Figure 6:
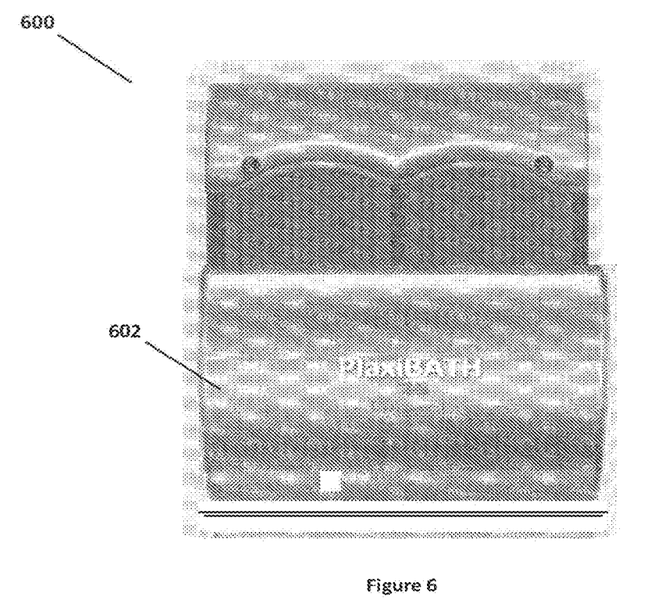
FIG. 6 illustrates a sliding door bathing apparatus according to another embodiment of the present invention.

FIG. 6 illustrates a sliding door bathing apparatus according to another embodiment of the present invention. The bathing apparatus (600) includes sliding door (602) as a replacement of the front panel. The bathing apparatus (600) includes a control or push button switch (not shown) which automatically closes the bath door. The user sitting inside the bathing door feels comfortable for easy closing of the bathing apparatus. The sliding door (602) can be configured to close from sides or from bottom. There are also a set of wheels at the bottom on this sliding door bathtub which allows the device to be pushed to anywhere. Furthermore another advantage of this sliding door bathtub is that the user can (1) slide the door all the way to the top where only the head of the user or users is visible thereby allowing the user/s to use the bathtub even in the living room or garden in full view of others without exposing their body/s. (2) This bathtub can accommodate from one to 5 persons to take bath simultaneously as each person will sit in their own respective cubicle although the door will be using the same one. (3) Another advantage of this bath is that the user/s can have their bath with the door slide half way or all the way (for the model where the door slides from bottom to upwards).

Figures 7A, 7B, 7C:
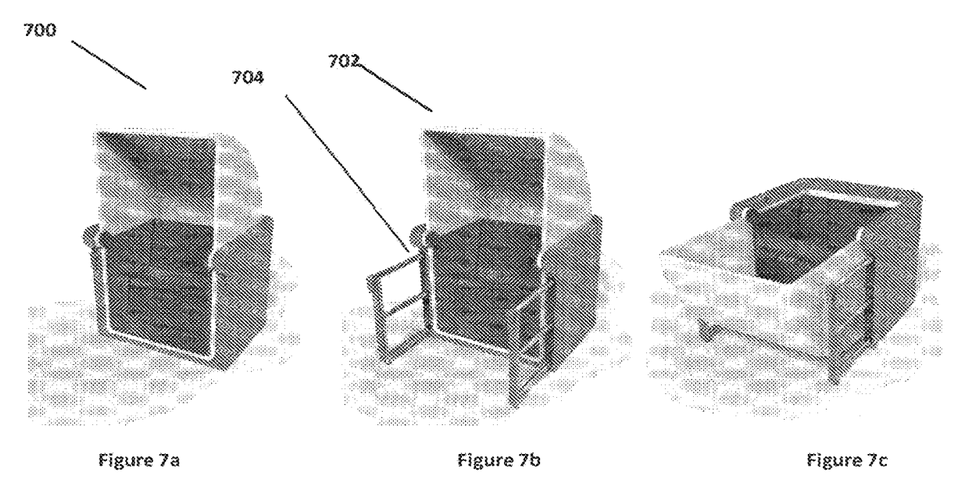
FIG. 7a-7c illustrates a rotatable bathing apparatus according to another embodiment of the present invention.
Figure 8A:
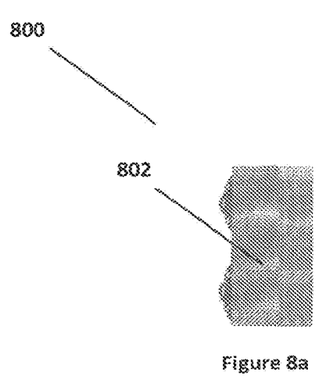
FIGS. 8a-8g illustrate a click and lock method of making bathing apparatus.
Figure 8B:
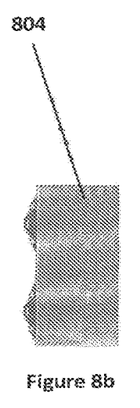
Figure 8C:
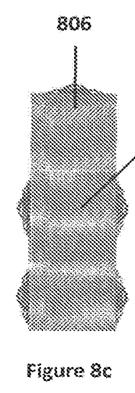
Figure 8D:
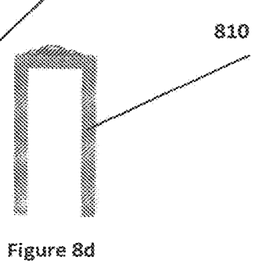
Figure 8E:
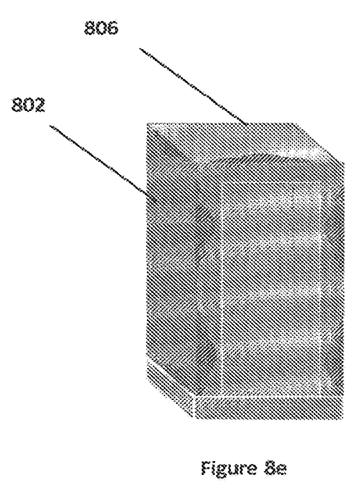
Figure 8F:
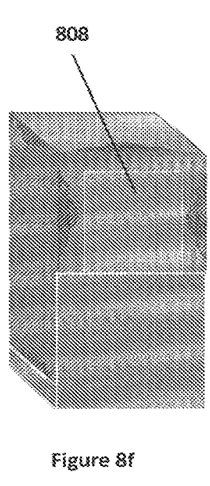
Figure 8G:
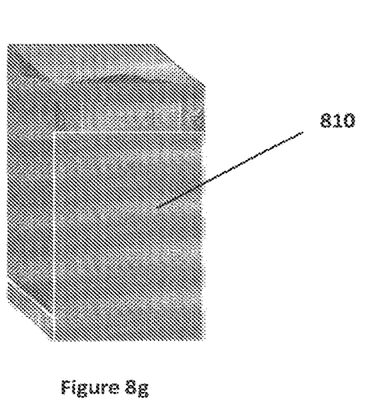

FIGS. 7a-7c illustrate a rotatable bathing apparatus according to another embodiment of the present invention. The bathing apparatus (700) as illustrated in FIGS. 7a-7b includes a control or push button switch (not shown) that rotates the bathtub (702) whereby bathtub itself can be rotate, which allows the user to move into his seat, the first half of the bathtub will rotate from a pivot point to a level itself inside a one side opened box lie structure. Once the bathing apparatus is adjusted to safe position the user can take the shower or fill up the bathtub with water to soak himself as shown in FIG. 7c. Referring to FIG. 7b, the bathing apparatus (700) further includes a set of guide rails (704) on either side which acts as supports to the user who is facing difficulties in walking without support.

FIGS. 8a-8g illustrate the click and lock method of making bathing apparatus. The method includes multiple sides such as left side (802), right side (804), top side (806) and back side (808) partitions. These partitions come in different forms and sizes, but rectangular size is preferred. Each end of the partition (802, 804, 806, 808) is arranged with click to lock arrangement to join the adjacent partitions in making of bathing apparatus. Once the arrangement is made the front panel forms the entry into the bathing apparatus. The front panel is provided with a flap system to close the bathing apparatus after entry. The complete bathing apparatus is arranged on a rectangular shaped structure. The rectangular shaped structure and front panel allows holding the water while bathing. The water inlet and outlet pipes are connected to the bathing apparatus to receive the fresh water and release the used water. A rubber lining is arranged at the joining ends of the front door which prevents the water from leaking out.

According to an embodiment, the front panel can be closed by a gadget pulling a string or stainless wire and the like. The gadget is mechanically or hand operated wire rope/string winding machine or can be an electrically operated type. By using the gadget user can close or open the front panel.

Figure 9:
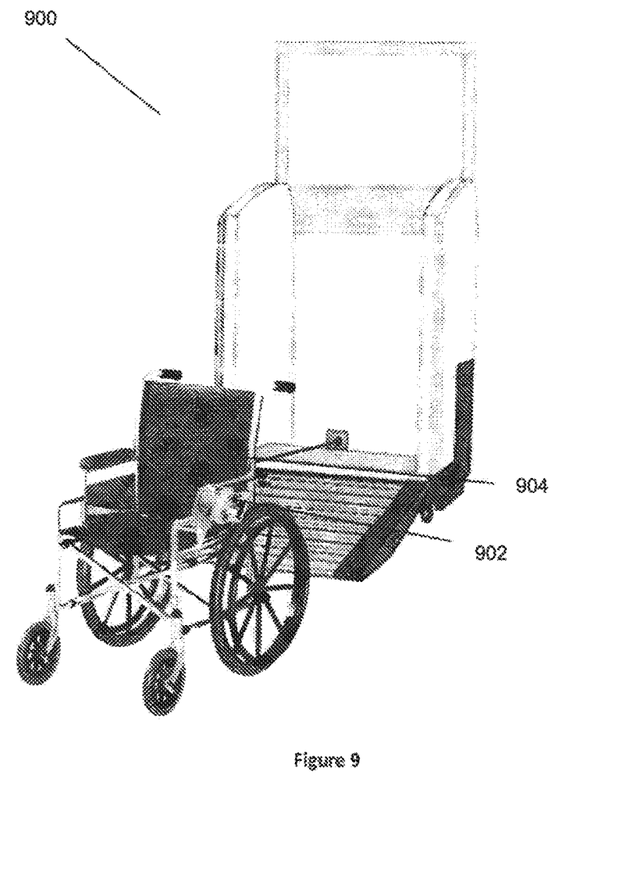
FIG. 9 illustrates an expanding or retractable cable extending from the bathing apparatus to retract or release the wheel chair with accordance to a preferred embodiment of the present invention.

FIG. 9 illustrates an expanding or retractable cable (902) extending from the bathing apparatus to retract or release the wheel chair (904) with accordance to a preferred embodiment of the present invention. The wheel chair (904) with the user sitting on it will be automatically be pulled in through either a cable pulling system (902) or through any other mechanical system whereby the user do not need to use his own personal strength to wheel the wheel chair (904) into the bathing apparatus.

According to the preferred embodiment of the present invention, the bathing apparatus includes additional water tanks mounted on both sides of bathing apparatus. So the users can have a non-stop bath by using the water shower as the water will recirculate round and round all by itself.

According to the preferred embodiment of the present invention, the bathing apparatus includes a seat that can be folded downwards to allow those users who need to come in together with their wheelchairs enough space to enable the entry of the wheelchair together.

Furthermore the invention can be more useful, if the patient is not well enough to walk to the bathroom, then the bathing apparatus can be pushed since it is mobile to the side of the bed of the patient and the patient being lead into it by a care giver. As very little water is required to take a long bath, so the bathing apparatus is very advantageous to who cannot afford to pay too much for water or they are living in an area where there is a shortage of water.

The invention can also useful for kids as a lot of kids like to play with water while taking their bath but because the parents do not want to waste too much water, they therefore disallow the kid from taking a long bath.

The invention can also useful for persons who live in the jungle or who need to pursue some work inside the jungle where the water source is quite far from the work camp.

As will be readily apparent to those skilled in the art, the present invention may easily be produced in other specific forms without departing from its essential characteristics. The present embodiments is, therefore, to be considered as merely illustrative and not restrictive, the scope of the invention being indicated by the claims rather than the foregoing description, and all changes which come within therefore intended to be embraced therein.

The invention claimed is:

1. A collapsible, mobile bathing apparatus comprising a plurality of partitions comprising:
    an inlet pipe for receiving water;
    an outlet pipe for releasing water;
    a lower body including one or more engine components;
    an upper body mounted on the lower body, wherein the upper body is configured as a watertight enclosure comprising a plurality of holes configured to pass through by thread-less bolts joined by a horizontal bar, thereby fitting the upper body on to the lower body to accommodate a person in a seated position in the watertight enclosure;
    a front panel containing joining ends, wherein the joining ends are configured to be filled with a rubber lining for connecting the front panel to the upper body, thereby preventing water from leaking out of the collapsible, mobile bathing apparatus;
    wherein the lower body further comprises a plurality of tanks that are configured to manage the water contained in the upper body by receiving the water from the upper body, the water being subjected to a recycling process before pumping the water into the upper body.

2. The collapsible, mobile bathing apparatus of claim 1, wherein the lower body comprises a bottom panel fitted with a plurality of wheels.

3. The collapsible, mobile bathing apparatus of claim 1, wherein the watertight enclosure has four sides and the front panel is openable to allow for a person to step in or out.

4. The collapsible, mobile bathing apparatus of claim 1, wherein the upper body has the capacity to accommodate a person in a wheelchair.

5. The collapsible, mobile bathing apparatus of claim 1, wherein the front panel of the upper body is configured with a drawbridge having a rough surface.

6. The collapsible, mobile bathing apparatus of claim 1, wherein the plurality of partitions includes ends of the partitions that are arranged with a click to lock arrangement for joining of the adjacent partitions in assembling this collapsible, mobile bathing apparatus.

7. The collapsible, mobile bathing apparatus of claim 5, wherein the front panel comprises a flap system that closes the bathing apparatus after entry of a person in the upper body of the collapsible mobile bathing apparatus.

* * * * *